H. RHYN.
Pipe-Wrench.

No. 8,961. Reissued Nov. 11, 1879.

Attest:
Courtney A. Cooper.
William Paxton.

Inventor
Henry Rhyn
By his attorney
Charles E. Foster

N. PETERS, PHOTO-LITHOGRAPHER, WASHINGTON, D. C.

UNITED STATES PATENT OFFICE.

HENRY RHYN, OF OMAHA, NEBRASKA.

IMPROVEMENT IN PIPE-WRENCHES.

Specification forming part of Letters Patent No. 218,195, dated August 5, 1879; Reissue No. 8,961, dated November 11, 1879; application filed October 15, 1879.

*To all whom it may concern:*

Be it known that I, HENRY RHYN, of Omaha, Douglas county, Nebraska, have invented an Improvement in Pipe-Wrenches, of which the following is a specification.

The object of my invention is a pipe-wrench constructed, as fully described hereinafter, to prevent the wrench from slipping from the pipe, to insure a firm hold and ready operation, and preserve the operating-spring, and permit ready application to the pipe.

Figure 1:
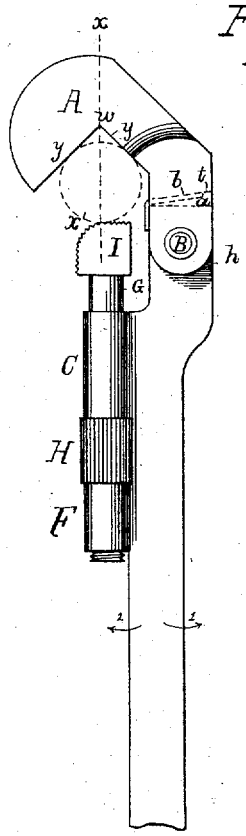
Figure 2:
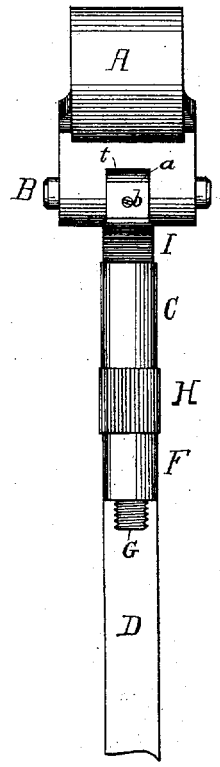

In the drawings forming part of this specification, Figure 1 is an external view of the tool; Fig. 2, an edge view; and Fig. 3, a detached section.

D is the arm or lever, having at one edge two lugs, C F, through which extends the threaded rod G, the head I of which constitutes the biting-jaw or abutment of the tool. This head is rounded at the outer corner, $x'$, for the purpose described hereinafter, and has biting-teeth.

Figure 3:
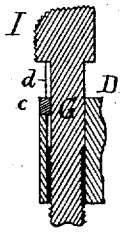

The rod or stem G is threaded to receive a nut, H, which lies between the lugs C F, and which may be turned to raise and lower the head, the stem G being prevented from turning by a feather, $c$, extending into a groove, $d$, Fig. 3.

To an arm, $h$, at the end of the lever D, is pivoted by a pin, B, the movable jaw A, constructed with two bearing-edges, $y$ $y$, about at right angles to each other, and so arranged that when operating upon a rod or tube their point of junction $w$ will be directly upon a line, $x$, passing through the axis of the stem G.

A spring, $b$, fastened to the arm $h$, tends to throw the jaw A forward over the abutment I.

When the tool is applied to turn the pipe or rod, the edges $y$ $y$ bear upon the same at points about equidistant from the line $x$, and the head I, being adjusted, bears upon the opposite side of the tube at the point intersected by said line, as shown.

On turning the lever in the direction of the arrow 2, Fig. 1, the contact-points will bear with great force upon the rod, clamping the same immovably between the jaws; but on carrying the handle in the direction of the arrow 1 the head I will be lifted from the tube, round which the jaw A will slide until the motion is reversed, when the tube will be clamped, as before.

It will be seen that the three bearing-points are so situated that the pressure will be substantially equal on all sides of the tube, so that the latter will not be flattened by the heaviest pressure; and it will further be seen that by elevating or lowering the head I this relative position is maintained, whatever be the size of the tube, this resulting from the fact that the faces $y$ $y$ are at the same angle to the line $x$.

By rounding off the edge $x'$, the introduction of the tube between the jaws is facilitated, while polygonal articles may be clamped between the opposite face, $y$, and the said rounded edge.

The end $a$ of the arm $h$ is flat, as is also the corresponding face $t$ of the jaw $b$, so that the jaw has a firm bearing when thrown back, thereby keeping the tool in position on the pipe, and enabling the operator to use the tool with one hand. Without this positive bearing, insuring only a limited play of the jaw A, it would be difficult to use the tool with one hand.

Thus, in ordinary wrenches, where the jaw bears on the spring, if the latter is weak and the weight of the tool is brought on the jaw, the latter will turn back and the tool slip from the pipe, rendering the use of both hands necessary. If, to avoid this, the spring is made strong enough to resist the weight of the tool, the jaws are always pressed upon the pipe, and the latter is abraded in turning the tool on the same, and it is difficult and tiresome to work the tool.

By the construction described the jaw can turn back under a slight pressure, but not sufficiently to permit the tool to slip from the pipe, while the spring will clamp the jaws on the pipe in turning forward.

The spring, furthermore, is concealed, so that it cannot be injured by blows upon the tool, or by striking the latter against hard substances.

I claim—

1. The combination, in a pipe-wrench, of the lever D, its lugs C F, stem G, carrying the head I and adjusting-nut H, and springjaw A, pivoted at B, having griping-faces *y y*, arranged at right angles, and an inclined face, *t*, arranged to bear on the end *a* of the lever when the jaw is thrown back, all as set forth.

2. The combination of the lever D, jaw I, pivoted jaw A, and spring *b*, arranged between the end of the lever and face *t*, of the jaw A, as set forth.

In testimony whereof I have signed my name to this specification in the presence of two subscribing witnesses.

HENRY RHYN.

Witnesses:
H. LAUER,
HENRY HEINS.